United States Patent [19]

Giorgio et al.

[11] Patent Number: 4,638,112
[45] Date of Patent: Jan. 20, 1987

[54] STOP JOINT FOR INTERCONNECTING TWO ELECTRICAL CABLES OF DIFFERENT TYPES

[75] Inventors: Giancarlo Giorgio; Bruno Parmigiani, both of Milan, Italy

[73] Assignee: Societa' Cavi Pirelli S.p.A., Milan, Italy

[21] Appl. No.: 809,147

[22] Filed: Dec. 16, 1985

[30] Foreign Application Priority Data

Dec. 17, 1984 [IT] Italy .................. 24092 A/84

[51] Int. Cl.⁴ ........................... H02G 15/25
[52] U.S. Cl. ................................. 174/22 R
[58] Field of Search .......... 174/20, 21 R, 21 C, 174/22 R, 22 C, 84 R, 88 R, 88 C, 91

[56] References Cited

FOREIGN PATENT DOCUMENTS 211618 11/1957 Australia .................. 174/22 R

Primary Examiner—Laramie E. Askin
Attorney, Agent, or Firm—Brooks, Haidt, Haffner & Delahunty

[57] ABSTRACT

A stop joint between a pair of electrical cables of different types, such as an oil filled cable and a cable with extruded insulation. Both cable ends are terminated in a known manner except that the conductor of one cable is mechanically and electrically connected to the conductor of the other cable by a rod surrounded by a body of insulation, portions of the insulation at opposite ends thereof being respectively covered by the insulation of the terminating elements of one cable and by the insulation of the terminating elements of the other cable. The body has a flange which is clamped to one of the cable terminating elements, and to provide electrical interconnection of the cable shields, the central portion of the body is covered with a semiconductive varnish.

6 Claims, 1 Drawing Figure

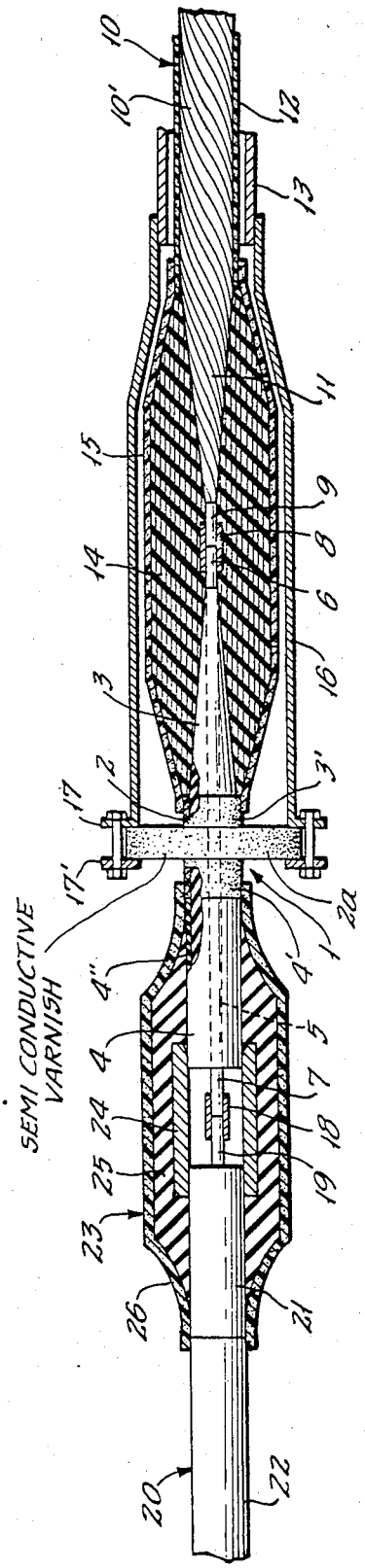

STOP JOINT FOR INTERCONNECTING TWO ELECTRICAL CABLES OF DIFFERENT TYPES

The present invention relates to a stop joint between cables of two different types, one type of cable having an extruded insulation and the other type of cable having both insulation and a dielectric fluid, such as oil-filled cables, the so-called "pipe" type cables, gas-insulated cables, and compound insulated cables. Both types of cables may have a single-core or multiple cores.

At present, to effect the connection between a cable having an extruded insulation and a cable having an insulation assisted by a dielectric fluid, recourse is had to joints having the general structure described hereinafter.

On the end of each one of the two cables to be connected, there is mounted a sealing end of type compatible with the cable to which it is applied. The lugs of the sealing ends are then mechanically and electrically connected to each other, and a metal box filled with an insulating fluid encloses the two sealing ends.

The known joints which have been briefly described, although differing from each other due to the particular configurations of the two sealing ends and to the box enclosing these latter, have a very complex structure and therefore their assembly requires a longer time than that necessary for effecting joints between cables of the same type.

Moreover, the radial size of such known joints is greater than that of the joints between cables of the same type because of the need of providing a box for containing the sealing ends and filled with an insulating fluid. This constitutes a great drawback in all those situations where the laying of an electric line portion, which comprises cables having an extruded insulation and cables having an insulation assisted by a dielectric fluid, has to take place in pre-existing structures which often impose limitations in radial direction for the components of the line. Moreover, in the case of an already laid line formed by portions of cables, for example, all oil filled cables, it can be impossible to substitute a cable having an extruded insulation for a portion of the oil filled cable due to the great radial size of the known joints necessary to carry out the connection between the two different types of cables.

In fact, if the cavity where the joint has to be housed is in a structure such as, for instance, the structure of a bridge, the foundation of a building and the like, and has radial dimensions suitable only for a joint between oil filled cables, said cavity is not able to house a known joint of the type to which the present invention relates due to the greater radial dimensions of the known joint.

One object of the present invention is to provide a stop joint between cables having an extruded insulation and cables having an insulation assisted by a dielectric fluid which joint has radial dimensions equal to those of the joints between cables of the same type and which has a simple structure, and therefore, can be rapidly installed.

The principal object of the present invention is a stop joint between cables having an extruded insulation and cables having an insulation assisted by a dielectric fluid, characterized by the fact of comprising at least a through insulator based on epoxy resins, embedding a metal bar whose ends project from opposite ends of the through insulator, a metal box tightly connected to the through insulator body and to the metal sheath of the cable having an insulation assisted by a dielectric fluid, said box being filled with the same dielectric fluid as the cable and enclosing a mechanical and electrical connection between the conductor of this latter and the bar of the through insulator, and a stratified insulation, said through insulator having the end turned toward the cable with the insulation assisted by the dielectric fluid of frusto-conical shape and the end turned toward the cable with the extruded insulation of cylindrical shape and that a monolithic sleeve embraces the cylindrical end of the through insulator and the final portion of the cable with the extruded insulation enclosing a mechanical and electrical connection between the conductor of this latter and the bar of the through insulator.

Other objects and advantages of the present invention will be apparent from the following detailed description of the presently preferred embodiments thereof, which description should be considered in conjunction with the single FIGURE of the drawing which is a partial longitudinal sectional view of the stop joint of the invention.

As shown in the drawing, the joint comprises an insulator 1 provided with a central body portion 2 and two end portions 3 and 4. The insulator 1 is constituted by an insulating mass, preferably made of a compound based on epoxy resins of type known per se, in which a through conductor, constituted by a rod 5 of metal material, for instance, aluminum, is embedded.

The end portion 3 of the insulator 1 has a frusto-conical shape, and the end portion 4 of the insulator 1 has a cylindrical shape. The central body portion 2 of the insulator 1 has an outwardly extending flange 2a in the shape of a plate provided with flat faces.

The rod or bar 5 has the ends 6 and 7 projecting from the insulating material of the insulator 1.

The end 6 of the bar 5 is mechanically and electrically connected, such as by a ferrule 8 or by a weld or the like, to the conductor 9 of a cable 10 having an insulation assisted by a fluid under pressure, which in the particular embodiment shown in the drawing is a known type of oil filled cable.

The end of the oil filled cable 10 has been previously prepared in a conventional manner by stepwise stripping of the components. In particular, the components which have been stripped are the end 9 of the cable conductor 10, the stratified, solid insulation 10' of the cable, which has a pencil-point tapered configuration 11, the outer semi-conductive layer 12 and the sealing metal sheath 13.

A layer 14 of insulating material is applied on the mechanical and electrical jointing zone of the conductors 6 and 9. The layer 14 can be obtained by winding a plurality of tapes of insulating material, such as, for instance, tapes of cellulose paper and the like. In the alternative, the layer 14 is formed by superimposing a plurality of cylindrical sleeves, each one of which is formed in place by the winding of tapes of insulating material, terminating each sleeve at the tapered surface of the insulator 1 and of the cable insulation 11 through windings of tapes of insulating crepe papers.

The layer 14 embraces the pencil-point shaped end 11, of the stratified insulation 10' of the cable 10 and the frusto-conical end 3 of the insulator 1 with the exception of the root portion 3' of said end 3.

The ends of the layer 14 are tapered as indicated in the drawing, and a winding of a semi-conductive tape, forming a layer 15, covers the layer 14 and extends to the outer semi-conductive screen 12 of the oil filled cable 10 and to the root 3' of the end 3, said layer 15 engaging the central body portion 2 of the insulator 1, the root 3' and the central body portion 2 being covered with a semi-conductive varnish. In this way, there is semi-conductive electrical connection between the screen or layer 12 and the central body portion 2.

A metal box 16 filled with the insulating fluid oil of the cable 10 encircles the insulating layer 14 and is tightly connected, for instance, by a weld, to the outer metal sheath 13 of the oil filled cable at one end, while at the other end said box 16 is tightly connected through the flange 17 and the counter-flange 17' to the central body portion 2 of the insulator 1.

As previously stated, a layer of semi-conductive varnish covers the central body portion 2 of the insulator 1. Also, the root portions 3' and 4' of the ends 3 and 4 of the insulator 1 are covered with a layer of semi-conductive varnish.

Moreover, the cylindrical end portion 4 of the insulator 1, except its root portion 4', preferably is covered with a layer 4" of insulating resin, such as an epoxy resin, which is cold cross-linked so as to provide a very smooth outer surface for said end portion 4.

The end portion 7 of the rod or bar 5 of the insulator 1 projects from the cylindrical end 4 of the insulator 1. The end of the conductor 19 of a cable 20 having an extruded insulation 21 is mechanically and electrically connected at the end 7 of the rod 5 through means known per se, such as a ferrule 18 or a weld.

The end portion of the cable 20 has its own components stripped stepwise and specifically, the conductor 19, the extruded insulation 21, the outer diameter of which is equal to the outer diameter of the cylindrical end 4 of the insulator 1, and the outer semi-conductive layer 22 are stripped so as to have the configuration shown in the drawing.

A metal adaptor, of a type known per se and not shown, is interposed between the facing ends of the extruded insulation 21 of the cable 20 and of the end portion 4 of the insulator 1, and encloses a ferrule 18.

A monolithic sleeve 23 for joints between extruded insulation cables, of a type known per se, is fitted around the mechanical and electrical jointing zone between the conductor 19 of the cable 20 and the conductor 5 within the insulator 1. Said monolithic sleeve 23, starting from the inside toward the outside, comprises a conductive field deflector 24 which is surrounded by an insulating layer 25 which, in turn, is covered with a semi-conductive layer 26 which puts into semi-conductive communication the semi-conductive layer 22 of the cable 20 with the surface of the semi-conductive layer on the root portion 4' formed by the conductive varnish on the root portion 4' of the end 4 and on the central body portion 2 of the insulator 1.

The described joint, illustrated in the drawing, carries out the mechanical and electrical connection between a single core cable having an extruded insulation and a single core oil filled cable. However, by means of the joints according to the present invention, it is possible to effect connections between multi-core cables, for instance, multi-core oil filled cables and multi-core cables having an extruded insulation.

In this latter case, the number of insulators 1 to be provided will be as many as the number of cores of the cables to be connected. The only difference will be that the central body portions 2 of the insulators 1 will be secured to each other in a tight manner. For example, the central body portions 2 may be part of a single, monolithic plate, like the plate 2a, of an epoxy resin covered with a conductive varnish. As an alternative, said plate can be made of a metal, for example, of non-magnetic steel and provide as many holes as there are insulators 1 which are tightly received in such holes.

From the description of an embodiment according to the invention, it will be understood that the objects of the invention are achieved.

Firstly, the space occupied in radial direction by a joint according to the present invention has a size of the same order of magnitude as that of the prior art joints between cables of the same type, i.e. joints for cables which both have an extruded insulation or for cables which both have an insulation assisted by a dielectric fluid.

In fact, both for the connection between the insulator 1 and a cable having an insulation assisted by a dielectric fluid, and for the connection between the insulator and a cable having an extruded insulation, the thickness of the insulation superimposed at the jointing zone is equal to that between cables of the same type.

In addition, the forming of the joint according to the invention is rapid and simple since it consists of assembling an insulator of the prefabricated type, a prefabricated monolithic sleeve, a prefabricated sealing box and of forming an insulating layer 14 through the winding of tapes generally used in the making of joints between cables having an insulation assisted by a dielectric fluid.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Stop joint between two electrical cables of different types, one of said cables being insulated with layers of solid insulation which are impregnated with a dielectric fluid and having a sheath and the other of said cables having extruded solid insulation without a dielectric fluid and each of said cables having a conductor, said stop joint comprising:

a body of insulating material enclosing a metal rod except at end portions thereof, one end portion of said rod extending from one end of said body and the other end portion of said rod extending from the other end of said body, said body having an outer surface of a decreasing taper in the direction from a portion of the body intermediate its ends toward said one end of said body and of cylindrical form in the direction from said portion of said body intermediate its ends to said other end of said body;

first connecting means mechanically and electrically connecting said one end portion of said rod to the end of the conductor of said one of said cables;

layers of solid insulation around said first connecting means, around a portion of the insulating material of said body adjacent said one end portion of said rod and around an end portion of said insulation of said one cable;

a conductive enclosure around the last-mentioned said layers of solid insulation and said first connecting means and connected in fluid-tight relation at one end with said sheath and at the opposite end with said body to provide a fluid-tight enclosure around the last-mentioned said layers of solid insulation and said first connecting means;

dielectric fluid of said one cable in said enclosure;

second connecting means mechanically and electrically connecting said other end portion of said rod to the end of the conductor of said other of said cables; and a composite sleeve including solid insulation around said second connecting means, a portion of the insulating material of said body adjacent to said other end portion of said rod and a portion of the extruded solid insulation of said other of said cables adjacent to said second connecting means, said composite sleeve being without a metal enclosure therearound.

2. A stop joint as set forth in claim 1 wherein said composite sleeve is part of a monolithic sleeve.

3. A stop joint as set forth in claim 2 wherein said layers of solid insulation around said first connecting means comprises layers of wrapped tape.

4. A stop joint as set forth in claim 1 wherein said body has an outwardly extending flange at a portion of said body spaced from its ends and wherein said flange is mechanically secured to said opposite end of said conductive enclosure in fluid-tight relation therewith.

5. A stop joint as set forth in claim 1 further comprising a layer of conductive material on a portion of the surface of said body intermediate its ends.

6. Stop joint between two electrical cables of different types, one of said cables being insulated with solid insulation and a dielectric fluid and having a conductive sheath and the other of said cables having solid insulation with a conductive layer thereon and each of said cables having a conductor, said stop joint comprising:

a body of insulating material enclosing a metal rod except at end portions thereof, one end portion of said rod extending from one end of said body and the other end portion of said rod extending from the other end of said body and said body having a layer of conductive material on a portion of the surface thereof intermediate its ends;

first connecting means mechanically and electrically connecting said one end portion of said rod to the end of the conductor of said one of said cables;

solid insulation around said first connecting means and a portion of the insulating material of said body adjacent said one end portion of said rod;

a conductive enclosure around said solid insulation and said first connecting means and connected electrically, mechanically and in fluid-tight relation at one end to said sheath, connected at the opposite end in fluid-tight relation with said body to provide a fluid-tight enclosure around said solid insulation and said first connecting means and electrically connected at its said opposite end to said layer of conductive material on said body;

dielectric fluid of said one cable in said enclosure;

second connecting means mechanically and electrically connecting said other end portion of said rod to the end of the conductor of said other of said cables; and further solid insulation around said second connecting means, a portion of the insulating material of said body adjacent to said other end portion of said rod and a portion of the solid insulation of said other of said cables adjacent to said second connecting means, said further solid insulation being covered with a conductive layer which extends from said conductive layer on said solid insulation of said other cable to said layer of conductive material on said body and which is electrically connected to said conductive layer on said solid insulation of said other cable and to said layer of conductive material on said body.

* * * * *